UNITED STATES PATENT OFFICE.

ANTOINE HENRI IMBERT, OF GRAND-MONTROUGE, FRANCE, ASSIGNOR TO IMBERT PROCESS COMPANY, OF NEW YORK, N. Y., A CORPORATION OF NEW YORK.

METALLURGICAL METHOD OF TREATING OXIDIZED ZINC ORES (CALAMINS, OXIDS, SILICATES) BY THE PRECIPITATION PROCESS.

No. 875,580.          Specification of Letters Patent.          Patented Dec. 31, 1907.

Application filed June 6, 1907. Serial No. 377,592.

*To all whom it may concern:*

Be it known that I, ANTOINE HENRI IMBERT, engineer, residing at 75 Avenue de la République, Grand-Montrouge, Department of the Seine, France, a citizen of the French Republic, have invented a new and useful Improvement in the Metallurgical Method for Treating Oxidized Zinc Ores (Calamins, Oxids, Silicates) by the Precipitation Process, of which the following is a specification.

On the one hand, the property which iron, manganese, and their congenerates possess of displacing zinc from its oxid, when the mixture of the metal and of the oxid is carried to an extreme temperature, has been known for a long time as a laboratory experiment; but it is totally impracticable in industry. On the other hand, I have described an improved treatment of sulfid ores by the precipitation process, by means of iron or another analogous metal, the principal characteristic of which resides in the "dissolution" of the sulfid ore in a bath composed preferably of a mixture of oxid of iron and of sulfid of iron as set forth in my application Serial No. 377,591; this "dissolution" allows the reaction to be rapid, regular, uniform and about complete, and yet, at the same time, the temperature required does not exceed the possible industrial limits and the residual sulfid formed, on account of its "dissolution" in the bath, can be easily extracted from the retort, which is particularly interesting, desirable and valuable in the case of zinc which has to be worked in a closed vessel.

Now, I have applied to the treatment of oxidized zinc ores, the method "by dissolution" actually employed in the treatment of sulfid zinc ores and others, by the use of metals of the iron family and of others having similar properties.

It is this novel application which constitutes the object of the present invention.

When blende is dissolved in the normal "dissolvent", composed, with iron as a reagent, of sulfid and oxid of iron, if a portion of such blende be replaced by roasted calamin, the addition of metallic iron to the bath determines the disengagement of the whole of the zinc contained in the mixture of ores, save about 2 to 3%. If, without any other change, the proportion of zinc oxid be increased and, consequently, the amount of blende be diminished, the same result is obtained. At the limit, that is to say when dissolving nothing but zinc oxid, the extraction of almost the whole of the zinc is again obtained. The residue is composed of a well formed slag containing the gangues and of an iron matte, (sulfid and metallic iron), which re-enters over and over again, indefinitely, into the process of manufacture by adding simply the iron, preferably cast iron, and oxid of iron necessary to maintain the composition of the "dissolvent" bath constant. Without wishing in any manner to define or interpret the complex reactions which enter into play; it is to be noted that the result obtained gives a very simple and practically easy means of treating oxidized zinc ores (roasted calamin, oxids, silicates), without passing through the very slow and very costly reduction by carbon, the only method hitherto actually employed.

The cost of heating in the closed vessel can be reduced to a minimum by first performing the "dissolution" of the ores in the "dissolvent" by means of a reverberatory furnace, by pouring this mixture, which is very fluid, into a retort and by then adding the matte of a previous operation with addition of the necessary iron, the two latter elements having been previously melted in a furnace or in a cupola. The final residue, very fluid, runs out of the retort, or furnace, by a simple tapping hole, leaving the interior of the re-action chamber in good condition; whereas, without this process, it would be necessary to open the retort, or furnace, and remove the residue—in a sticky, adherent mass—by scraping or other operation.

Everything stated above for roasted calamins and other ores containing zinc in a state of free oxid, can be repeated for silicate of zinc, alone or mixed with blende. The same phenomena reproduce themselves exactly by means of the same "dissolvents" and practically at similar temperatures.

Under certain circumstances, manganese may be substituted for iron, in whole or in part, and, in accordance with the proportion of manganese, in the normal "dissolvent" (oxid and sulfid of iron), a portion of sulfid of iron, or a portion of oxid of iron, or a portion of both, can be replaced by an equivalent proportion of sulfid and oxid of manganese.

Naturally, the mode of heating remains entirely outside the sphere of the invention; which essentially consists in the application of the method "by dissolution" with the aid of a special "dissolvent," the chemical composition of which intervenes very probably as an intermediate re-agent, which dissolution permits the displacement of almost the whole of the zinc contained in ores wherein zinc is found in a state of oxid, either free, or in combination, by the aid of a re-acting metal, such, say, as iron, manganese, or others, having the same faculty of displacing the zinc.

Having thus described my invention, but without limiting myself to the precise operations and details specified, what I claim is:

1. The process of extracting zinc from oxid ores, which consists in heating the ore in the presence of a metallic oxid, a metallic sulfid of such a character as to form a dissolvent for said ores and a metallic reagent having a greater affinity for the element with which the zinc is combined than has zinc.

2. The process of extracting zinc from oxid ores, which consists in heating the ore in the presence of a metallic oxid and a metallic sulfid of such a character as to form a dissolvent for said ores with metallic iron.

3. The process of extracting zinc from oxid ores which consists in heating the ore with a mixture of a peroxid of iron, sulfid of iron and metallic iron.

4. The process of extracting zinc from oxid ores which consists in first heating the ore in the presence of a metallic oxid, a metallic sulfid of such a character as to form a dissolvent for said ores and a metallic reagent having a greater affinity for the element with which the zinc is combined than has zinc and then collecting the extracted zinc.

5. The process of extracting zinc from oxid ores which consists in first heating the ore in the presence of a metallic oxid, a metallic sulfid of such a character as to form a dissolvent for said ores and a metallic reagent having a greater affinity for the element with which the zinc is combined than has zinc to release the zinc in the form of vapor and then condensing the vaporized zinc.

6. The process which consists in heating oxidized zinc ores with iron in the presence of a dissolvent containing a metallic oxid and a metallic sulfid, drawing off the residual material, mixing a portion of said material with a metallic oxid, and with iron to form a new charge of the dissolvent.

In testimony whereof I have signed my name to this specification in the presence of two subscribing witnesses.

ANTOINE HENRI IMBERT.

Witnesses:
  FADA D' STUNOT,
  CLAUDIUS LUSSON.